(12) United States Patent
Cai et al.

(10) Patent No.: US 9,887,829 B2
(45) Date of Patent: Feb. 6, 2018

(54) INFORMATION PROCESSING METHOD AND APPARATUS

(71) Applicant: Huawei Technologies Co., Ltd., Shenzhen, Guangdong (CN)

(72) Inventors: Meng Cai, Chengdu (CN); Huaping Qing, Chengdu (CN); Yu Liu, Chengdu (CN); Hongli Jiang, Chengdu (CN); Qiao Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 142 days.

(21) Appl. No.: 14/983,841

(22) Filed: Dec. 30, 2015

(65) Prior Publication Data

US 2016/0112179 A1 Apr. 21, 2016

Related U.S. Application Data

(63) Continuation of application No. PCT/CN2013/078650, filed on Jul. 2, 2013.

(51) Int. Cl.
| | |
|---|---|
| *H04L 5/14* | (2006.01) |
| *H04L 7/00* | (2006.01) |
| *H04L 5/00* | (2006.01) |
| *H04L 25/02* | (2006.01) |

(52) U.S. Cl.
CPC .............. *H04L 5/14* (2013.01); *H04L 5/0048* (2013.01); *H04L 7/0033* (2013.01); *H04L 25/0226* (2013.01)

(58) Field of Classification Search
CPC ..... H04L 5/14; H04L 7/0033; H04L 25/0226; H04L 5/0048
See application file for complete search history.

(56) References Cited

U.S. PATENT DOCUMENTS

| | | | | |
|---|---|---|---|---|
| 5,867,478 A | * | 2/1999 | Baum | ..................... H04L 1/06 370/203 |
| 7,020,226 B1 | * | 3/2006 | Kirkland | ............... H04L 5/0048 370/203 |

(Continued)

FOREIGN PATENT DOCUMENTS

| | | |
|---|---|---|
| CN | 101039127 A | 9/2007 |
| CN | 101394385 A | 3/2009 |

(Continued)

*Primary Examiner* — Mohammad Adhami
*Assistant Examiner* — Shailendra Kumar (57) ABSTRACT

The present invention discloses an information processing method and apparatus, including: obtaining a local to-be-transmitted signal by using a local transmitter, and inserting first pilots and second pilots, where the first pilots are inserted from a first position of the local to-be-transmitted signal, the second pilots are inserted from a second position of the local to-be-transmitted signal; obtaining a local transmit signal; obtaining a peer transmit signal, where the peer transmit signal is sent after third pilots and fourth pilots are inserted, the third pilots are inserted from a third position of the peer transmit signal, the fourth pilots are inserted from a fourth position of the peer transmit signal, the first pilot is orthogonal to the fourth pilot, and the second pilot is orthogonal to the third pilot; and parsing the local transmit signal and the peer transmit signal by using the local receiver.

20 Claims, 5 Drawing Sheets

(56) References Cited

U.S. PATENT DOCUMENTS

| | | | |
|---|---|---|---|
| 8,774,137 B2* | 7/2014 | Yu | H04L 5/0023 370/206 |
| 2007/0189404 A1 | 8/2007 | Baum et al. | |
| 2007/0217328 A1 | 9/2007 | A M Bune et al. | |
| 2008/0013500 A1* | 1/2008 | Laroia | H04B 7/2621 370/338 |
| 2008/0298264 A1* | 12/2008 | Ramesh | H04B 7/0671 370/252 |
| 2009/0015478 A1 | 1/2009 | Li et al. | |
| 2010/0273472 A1 | 10/2010 | Drewes et al. | |
| 2011/0235540 A1 | 9/2011 | Yu et al. | |
| 2012/0051457 A1* | 3/2012 | Ma | H04L 5/0023 375/295 |

FOREIGN PATENT DOCUMENTS

| | | |
|---|---|---|
| CN | 101467375 A | 6/2009 |
| CN | 101803321 A | 8/2010 |
| CN | 101820325 A | 9/2010 |
| CN | 101938449 A | 1/2011 |
| CN | 102684859 A | 9/2012 |
| CN | 102983956 A | 3/2013 |
| EP | 2 919 428 A1 | 9/2015 |
| WO | WO 99/07090 A1 | 2/1999 |
| WO | WO 03/034604 A1 | 4/2003 |

* cited by examiner

INFORMATION PROCESSING METHOD AND APPARATUS

CROSS-REFERENCE TO RELATED APPLICATIONS

This application is a continuation of International Application No. PCT/CN2013/078650, filed on Jul. 2, 2013, which is hereby incorporated by reference in its entirety.

TECHNICAL FIELD

The present invention relates to the field of communications technologies, and in particular, to an information processing method and apparatus.

BACKGROUND

At present, with the continuous development of a microwave technology in the field of communications, the microwave technology will develop from an existing Frequency Division Duplex (FFD) system to an Intra-frequency Full Duplex (IFD) system. The frequency division duplex system refers to: a system related to the microwave technology, where the system uses different frequencies for sending and receiving signals. The intra-frequency full duplex system refers to: a system related to the microwave technology, where the system uses a same frequency for sending and receiving signals. Certainly, using the IFD system achieves a better effect than using the FDD system, and can double bandwidth. At present, the IFD system has become one of the development trends of the microwave technology.

However, in the IFD system, a signal received by the system is a mixed signal of a peer transmit signal and a local transmit signal, and due to the defect of a relative delay between the two signals caused by different transmission distances, the system cannot perform pilot-based channel estimation, and therefore cannot perform channel initialization and phase noise suppression. For example, in FIG. 1, a case in which a transceiver 1 receives signals is described. The transceiver 1 is divided into a receiver 1 and a transmitter 1. The receiver 1 may receive a signal transmitted by the transmitter 1 (that is, a local transmit signal). In addition, assuming that a receiver 2 and a transmitter 2 are provided, the receiver 1 may further receive a signal transmitted by the transmitter 2 (that is, a peer transmit signal). Transmission distances of the two signals are different, and therefore, a relative delay exists when the receiver 1 receives the two signals. Then, during channel estimation, the channel estimation cannot be performed based on pilots, and therefore, subsequent steps such as channel initialization and phase noise suppression cannot be performed.

In order to solve the foregoing defect that channel estimation cannot be performed due to a delay, the following solution is used in the prior art.

Figure 1:
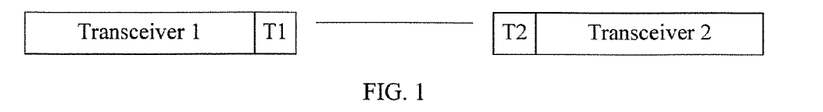
FIG. 1 is a schematic diagram of compensation for a delay between a transceiver 1 and a transceiver 2 in the prior art.

Primarily, a manner of offline delay alignment is used for processing. Referring to FIG. 1, two transceivers are described in FIG. 1, and the two transceivers have respective delays. It is assumed that periods of time of delays of the two transceivers are −T1 and −T2, respectively, where the minus indicates a delay. If the two transceivers are compensated according to T1 and T2, theoretically, no delay occurs between the two transceivers. Specifically, the delay of the transceiver 1 is −T1, and the delay of the transceiver 2 is −T2. That is, when the transceiver 1 processes a signal, an overall delay of a time −T1 occurs, and when the transceiver 2 processes a signal, an overall delay of a time −T2 occurs. Assuming that the transceiver 1 processes a signal at the moment of 0.5 seconds, and a delay of the transceiver 1 is 0.4 seconds, then a signal processing time of the transceiver 1 is actually 0.9 seconds. Assuming that the transceiver 2 processes a signal at the moment of 0.5 seconds, and a delay of the transceiver 2 is 0.2 seconds, then a signal processing time of the transceiver 2 is actually 0.7 seconds. In this case, if the transceiver 1 is compensated according to 0.4 seconds, and the transceiver 2 is compensated according to 0.2 seconds, the two transceivers both process the signal at the moment of 0.5 seconds, and no delay occurs.

Figure 2:
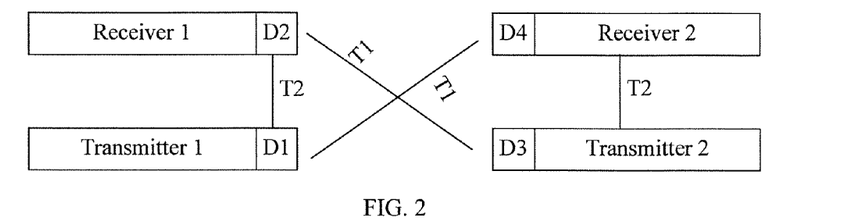
FIG. 2 is a schematic diagram of signal transmission between a transceiver 1 and a transceiver 2 in the prior art.

However, this method has the following defects:

As shown in FIG. 2, FIG. 2 describes a process of signal transmission between the transceiver 1 and the transceiver 2. In the IFD system, it is assumed that the receiver 1 needs a time T2 to receive a signal from the transmitter 1, and needs a time T1 to receive a signal from the transmitter 2, where generally, T1>T2, a delay time of the transmitter 1 is D1, a delay time of the receiver 1 is D2, a delay of the transmitter 2 is D3, and a delay of the receiver 2 is D4.

If the receiver 1 is used as a reference, it takes a time of D1+T2+D2 for the receiver 1 to receive the signal from transmitter 1, and it takes a time of D3+T1+D2 for the receiver 1 to receive the signal from the transmitter 2. When the two have a same transmission time, D1+T2+D2=D3+T1+D2, and after calculation, it is concluded that D1=D3+T1−T2.

In this case, a delay for receiving the signal from the transmitter 1 by the receiver 2 is: D1+D4+T1, and after calculation by substituting D1 into D1+D4+T1, it is obtained that the delay is: 2T1−T2+D4+D3. The receiver 2 needs a time T2 to receive the transmitter 2, and therefore, a delay for receiving the signal from the transmitter 2 by the receiver 2 is: D3+T2+D4. If delays of two signals received by the receiver 2 are the same, 2T1−T2+D4+D3=D3+T2+D4, and a result obtained by calculation is T1=T2; this result is inconsistent with T1>T2 described above. Therefore, this solution cannot solve the problem encountered by the IFD system.

In conclusion, the IFD system in the prior art has a technical problem that the system cannot perform channel estimation due to the defect of a relative delay caused by signal transmission distances.

SUMMARY

Embodiments of the present invention provide an information processing method and apparatus, which can compensate for a delay of a signal in an IFD system, to help the system perform channel estimation.

According to a first aspect of the present invention, an information processing method is provided, and the method includes:

obtaining a local to-be-transmitted signal by using a local transmitter, and inserting first pilots and second pilots into the local to-be-transmitted signal and transmitting the signal, where the first pilots are inserted from a first position of the local to-be-transmitted signal, the second pilots are inserted from a second position of the local to-be-transmitted signal, and the first position and the second position are separated by first preset duration, where the first preset duration is specifically a sum of a transmission delay of a local transmit signal relative to a peer receiver and a transmission delay of a peer transmit signal relative to the peer receiver;

obtaining a local transmit signal by using a local receiver;

obtaining a peer transmit signal by using the local receiver, where the peer transmit signal is sent after third pilots and fourth pilots are inserted, the third pilots are inserted from a third position of the peer transmit signal, the fourth pilots are inserted from a fourth position of the peer transmit signal, the third position and the fourth position are separated by second preset duration, the first pilot is orthogonal to the fourth pilot, and the second pilot is orthogonal to the third pilot, where the second preset duration is a sum of a transmission delay of the local transmit signal relative to the local receiver and a transmission delay of the peer transmit signal relative to the local receiver; and parsing the local transmit signal and the peer transmit signal by using the local receiver.

In a first possible implementation manner of the first aspect, the inserting first pilots and second pilots into the local to-be-transmitted signal and transmitting the signal specifically includes:

collecting a local-to-local equalization coefficient by using the local transmitter, and performing first delay compensation on the local to-be-transmitted signal to obtain a local compensation signal, where the local-to-local equalization coefficient is a delay coefficient of the local receiver relative to the local transmitter; and inserting the first pilots and the second pilots into the local compensation signal and transmitting the signal.

In a second possible implementation manner of the first aspect, the inserting first pilots and second pilots into the local to-be-transmitted signal and transmitting the signal specifically further includes:

inserting the first pilots and the second pilots into the local to-be-transmitted signal to obtain a pilot bearing signal; and collecting a local-to-local equalization coefficient by using the local transmitter, and performing first delay compensation on the pilot bearing signal and transmitting the signal.

In a third possible implementation manner of the first aspect, the inserting first pilots and second pilots into the local to-be-transmitted signal and transmitting the signal specifically further includes:

collecting a local-to-local equalization coefficient by using the local transmitter while the first pilots and the second pilots are inserted into the local to-be-transmitted signal, and performing first delay compensation on the local to-be-transmitted signal and transmitting the signal.

In a fourth possible implementation manner of the first aspect, the peer transmit signal specifically is:

a transmit signal into which the third pilots and the fourth pilots are inserted after the peer transmitter performs second delay compensation by using a local-to-peer equalization coefficient, where the local-to-peer equalization coefficient is a delay coefficient of the local receiver relative to the peer transmitter; or a transmit signal on which the peer transmitter performs second delay compensation by using a local-to-peer equalization coefficient after the third pilots and the fourth pilots are inserted; or a transmit signal on which the peer transmitter performs second delay compensation by using a local-to-peer equalization coefficient while the third pilots and the fourth pilots are inserted.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner, the obtaining a local to-be-transmitted signal by using a local transmitter, and inserting first pilots and second pilots into the local to-be-transmitted signal specifically includes:

obtaining the local to-be-transmitted signal by using the local transmitter, and sequentially inserting the first pilots into the local to-be-transmitted signal from the first position according to a first time interval, so that the first time interval exists between every two first pilots in the local to-be-transmitted signal, where the first position is a frame header position of the first frame of the local to-be-transmitted signal; and sequentially inserting the second pilots into the local to-be-transmitted signal from the second position according to a second time interval, so that the second time interval exists between every two second pilots in each frame of the local to-be-transmitted signal, and that the second time interval also exists between a second pilot at a frame trailer of the $i^{th}$ frame of the local to-be-transmitted signal and a second pilot at a frame header of the $i+1^{th}$ frame of the local to-be-transmitted signal, where i is a positive integer.

In a first specific implementation manner of the fifth possible implementation manner of the first aspect, the third pilots are specifically inserted from a third position of the first frame of the peer transmit signal according to a third time interval, so that the third time interval exists between every two third pilots in the peer transmit signal, where the third position is a frame header position of the first frame of the peer transmit signal.

In a second specific implementation manner of the fifth possible implementation manner of the first aspect, the fourth pilots are specifically inserted from the fourth position according to a fourth time interval, so that the fourth time interval exists between every two fourth pilots in each frame of the peer transmit signal, and that the fourth time interval also exists between a fourth pilot at a frame trailer of the $i^{th}$ frame of the peer transmit signal and a fourth pilot at a frame header of the $i+1^{th}$ frame of the peer transmit signal.

With reference to the first aspect, or the first possible implementation manner of the first aspect, or the second possible implementation manner of the first aspect, or the third possible implementation manner of the first aspect, or the fourth possible implementation manner of the first aspect, in a sixth possible implementation manner, the first pilot is an original pilot of the local transmitter, and the second pilot is a newly added pilot of the local transmitter.

With reference to the first aspect, or the first possible implementation manner of the first aspect, or the second possible implementation manner of the first aspect, or the third possible implementation manner of the first aspect, or the fourth possible implementation manner of the first aspect, in a seventh possible implementation manner, the third pilot is an original pilot of the peer transmitter, and the fourth pilot is a newly added pilot of the peer transmitter.

According to a second aspect of the present invention, an information processing apparatus is provided, including:

a local transmitter, configured to obtain a local to-be-transmitted signal, and insert first pilots and second pilots into the local to-be-transmitted signal and transmit the signal, where the first pilots are inserted from a first position of the local to-be-transmitted signal, the second pilots are inserted from a second position of the local to-be-transmitted signal, and the first position and the second position are separated by first preset duration, where the first preset duration is specifically a sum of a transmission delay of a local transmit signal relative to a peer receiver and a transmission delay of a peer transmit signal relative to the peer receiver; and a local receiver, configured to obtain a local transmit signal, where the local receiver is further configured to obtain a peer transmit signal, where the peer transmit signal is sent after third pilots and fourth pilots are inserted, the third pilots are inserted from a third position of the peer transmit signal, the fourth pilots are inserted from a fourth position of the peer transmit signal, the third position and the fourth position are separated by second preset duration, the first pilot is orthogonal to the fourth pilot, and the second pilot is orthogonal to the third pilot, where the second preset duration is a sum of a transmission delay of the local transmit signal relative to the local receiver and a transmission delay of the peer transmit signal relative to the local receiver; and the local receiver is further configured to parse the local transmit signal and the peer transmit signal.

In a first possible implementation manner of the second aspect, the local transmitter is further configured to:

collect a local-to-local equalization coefficient by using the local transmitter, and perform first delay compensation on the local to-be-transmitted signal to obtain a local compensation signal, where the local-to-local equalization coefficient is a delay coefficient of the local receiver relative to the local transmitter; and insert the first pilots and the second pilots into the local compensation signal and transmit the signal.

In a second possible implementation manner of the second aspect, the local transmitter is further configured to:

insert the first pilots and the second pilots into the local to-be-transmitted signal to obtain a pilot bearing signal; and collect a local-to-local equalization coefficient by using the local transmitter, and perform first delay compensation on the pilot bearing signal and transmit the signal.

In a third possible implementation manner of the second aspect, the local transmitter is further configured to:

collect a local-to-local equalization coefficient by using the local transmitter while the first pilots and the second pilots are inserted into the local to-be-transmitted signal, and perform first delay compensation on the local to-be-transmitted signal and transmit the signal.

In a fourth possible implementation manner of the second aspect, the peer transmit signal specifically is:

a transmit signal into which the third pilots and the fourth pilots are inserted after the peer transmitter performs second delay compensation by using a local-to-peer equalization coefficient, where the local-to-peer equalization coefficient is a delay coefficient of the local receiver relative to the peer transmitter; or a transmit signal on which the peer transmitter performs second delay compensation by using a local-to-peer equalization coefficient after the third pilots and the fourth pilots are inserted; or a transmit signal on which the peer transmitter performs second delay compensation by using a local-to-peer equalization coefficient while the third pilots and the fourth pilots are inserted.

With reference to the second aspect, or the first possible implementation manner of the second aspect, or the second possible implementation manner of the second aspect, or the third possible implementation manner of the second aspect, or the fourth possible implementation manner of the second aspect, in a fifth possible implementation manner, the local transmitter is specifically configured to:

obtain the local to-be-transmitted signal, and sequentially insert the first pilots into the local to-be-transmitted signal from the first position according to a first time interval, so that the first time interval exists between every two first pilots in the local to-be-transmitted signal, where the first position is a frame header position of the first frame of the local to-be-transmitted signal; and sequentially insert the second pilots into the local to-be-transmitted signal from the second position according to a second time interval, so that the second time interval exists between every two second pilots in each frame of the local to-be-transmitted signal, and that the second time interval also exists between a second pilot at a frame trailer of the $i^{th}$ frame of the local to-be-transmitted signal and a second pilot at a frame header of the $i+1^{th}$ frame of the local to-be-transmitted signal, where i is a positive integer.

In a first specific implementation manner of the fifth possible implementation manner of the second aspect, the third pilots are specifically inserted from a third position of the first frame of the peer transmit signal according to a third time interval, so that the third time interval exists between every two third pilots in the peer transmit signal, where the third position is a frame header position of the first frame of the peer transmit signal.

In a second specific implementation manner of the fifth possible implementation manner of the second aspect, the fourth pilots are specifically inserted from the fourth position according to a fourth time interval, so that the fourth time interval exists between every two fourth pilots in each frame of the peer transmit signal, and that the fourth time interval also exists between a fourth pilot at a frame trailer of the $i^{th}$ frame of the peer transmit signal and a fourth pilot at a frame header of the $i+1^{th}$ frame of the peer transmit signal.

With reference to the second aspect, or the first possible implementation manner of the second aspect, or the second possible implementation manner of the second aspect, or the third possible implementation manner of the second aspect, or the fourth possible implementation manner of the second aspect, in a sixth possible implementation manner, the first pilot is an original pilot of the local transmitter, and the second pilot is a newly added pilot of the local transmitter.

With reference to the second aspect, or the first possible implementation manner of the second aspect, or the second possible implementation manner of the second aspect, or the third possible implementation manner of the second aspect, or the fourth possible implementation manner of the second aspect, in a seventh possible implementation manner, the third pilot is an original pilot of the peer transmitter, and the fourth pilot is a newly added pilot of the peer transmitter.

DETAILED DESCRIPTION

For the technical problem in the prior art that an IFD system cannot perform channel estimation due to the defect of a relative delay caused by signal transmission distances, in the technical solutions provided herein by embodiments of the present invention, first, a local to-be-transmitted signal is obtained by using a local transmitter, and first pilots and second pilots are inserted into the local to-be-transmitted signal and the signal is transmitted, where the first pilots are inserted from a first position of the local to-be-transmitted signal, the second pilots are inserted from a second position of the local to-be-transmitted signal, and the first position and the second position are separated by first preset duration. Then, a local transmit signal is obtained by using a local receiver. Further, a peer transmit signal is obtained by using the local receiver, where the peer transmit signal is sent after third pilots and fourth pilots are inserted, the third pilots are inserted from a third position of the peer transmit signal, the fourth pilots are inserted from a fourth position of the peer transmit signal, the third position and the fourth position are separated by second preset duration, the first pilot is orthogonal to the fourth pilot, and the second pilot is orthogonal to the third pilot. Finally, the local transmit signal and the peer transmit signal are parsed by using the local receiver. Specifically, when the local receiver parses the local transmit signal and the peer transmit signal, the second pilot of the local transmit signal is inserted after the first preset duration and the third pilot of the peer transmit signal is inserted immediately. It is also after the first preset duration that the local transmitter receives the peer transmit signal, and therefore, when the local transmitter parses the obtained local transmit signal and peer transmit signal, the second pilot and the third pilot can be obtained at the same time, so that a transmission delay due to causes such as transmission distances can be avoided, and the system can perform channel estimation accurately. In addition, because the second pilot is orthogonal to the third pilot, it can be ensured that when two signals are transmitted to the local receiver, transmission of the two signals does not interfere with each other, and a transmission effect is relatively good.

Main implementation principles and specific implementation manners of the technical solutions of the embodiments of the present invention and beneficial effects that can be correspondingly achieved by the technical solutions are described in detail in the following with reference to the accompanying drawings.

Embodiment 1

Figure 3:
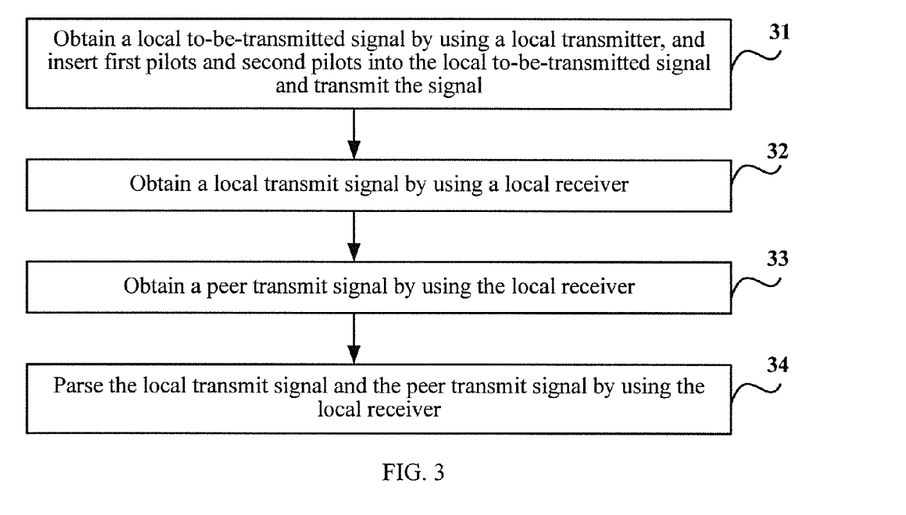
FIG. 3 is a flowchart of an information processing method according to Embodiment 1 of the present invention.

Embodiment 1 of the present invention provides an information processing method herein. As shown in FIG. 3, a specific processing process of the method is as follows:

Step 31: Obtain a local to-be-transmitted signal by using a local transmitter, and insert first pilots and second pilots into the local to-be-transmitted signal and transmit the signal.

Step 32: Obtain a local transmit signal by using a local receiver.

Step 33: Obtain a peer transmit signal by using the local receiver.

Step 34: Parse the local transmit signal and the peer transmit signal by using the local receiver.

In step 31, the first pilots are inserted from a first position of the local to-be-transmitted signal, the second pilots are inserted from a second position of the local to-be-transmitted signal, and the first position and the second position are separated by first preset duration.

In an IFD system, there may be multiple transceivers transmitting signals with each other, for example, two transceivers shown in FIG. 1, where a receiver of each transceiver may receive a signal from a local transmitter, and a signal from a peer transmitter. If a receiver 1 in a transceiver 1 is used as an example, the local transmit signal is a signal transmitted by a transmitter 1, and the peer transmit signal is a signal transmitted by a transmitter 2 in a transceiver 2.

For ease of description, in the technical solution provided herein by Embodiment 1 of the present invention, the transceiver 1 (the transceiver 1 specifically includes the receiver 1 and the transmitter 1) and the transceiver 2 (the transceiver 2 specifically includes a receiver 2 and the transmitter 2) are used herein for detailed description. Signal communication between other transceivers is similar to signal communication between the two transceivers herein.

Specifically, the transmitter 1 is used as the local transmitter, and the receiver 1 is used as the local receiver; the transmitter 2 is used as the peer transmitter, and the receiver 2 is used as the peer receiver.

When the local receiver receives the local transmit signal and the peer transmit signal, the two signals have different transmission distances, transmission duration, and the like, and a relative delay exists between the two signals. That is, the two signals arrive at the local receiver at different time points, and consequently, a problem that the system performs channel estimation erroneously or the system cannot perform channel estimation may exist.

In order to avoid this situation, the local transmitter and the peer transmitter both adjust signals thereof, so as to ensure that the two signals arrive at the local receiver nearly at a same time point.

A process of adjusting a signal by the local transmitter is shown in step 31: obtaining the local to-be-transmitted signal by using the local transmitter, and inserting the first pilots and the second pilots into the local to-be-transmitted signal and transmitting the signal.

Pilots are introduced first.

Pilot signals are unmodulated signals transmitted continuously by a base station. The pilot signals enable a mobile phone or another device to obtain channel information, provide a related demodulation phase reference, and provide signal strength comparison for each base station, and so on.

The first pilot in this embodiment of the present invention is an original pilot of the local transmitter, and the second pilot in this embodiment of the present invention is a newly added pilot of the local transmitter.

However, in an intra-frequency full duplex system, orthogonality cannot be maintained between an original pilot of the local transmit signal and an original pilot of the peer transmit signal; therefore, the two transmit signals both need newly added pilots to achieve orthogonality of the pilots during two-way simultaneous communication. In other words, one type of pilot can only ensure pilot orthogonality in one-way communication, while pilots in another direction cannot be orthogonal. For example, when the local receiver receives the local transmit signal and the peer transmit signal, because both the signals have original pilots only, considering issues of delays and signal interference, the two original pilots may be made orthogonal, to ensure pilot orthogonality in one-way communication. On the other hand, when the peer receiver receives the two signals, because of situations such as a delay of the receiver and a delay caused by the transmission distance, it is possible that the two pilots are not orthogonal during communication in an opposite direction; therefore, it is necessary to use two pilots to ensure pilot orthogonality in two-way communication.

When the first pilots and the second pilots are inserted into the local to-be-transmitted signal, the first pilots are inserted from the first position of the local to-be-transmitted signal, and the second pilots are inserted from the second position of the local to-be-transmitted signal. Moreover, the first position and the second position are separated by the first preset duration.

In this embodiment, insertion of the first pilots is introduced first.

During insertion of the first pilots, the first pilots are sequentially inserted into the local to-be-transmitted signal from the first position according to a first time interval, so that the first time interval exists between every two first pilots in the local to-be-transmitted signal.

The first time interval in this embodiment may be set to a specific numerical value, and examples are not listed herein in this application.

Specifically, the first position is a frame header position of the first frame of the local to-be-transmitted signal. Specifically, referring to FIG. 4a, the first frame of the local to-be-transmitted signal is used to describe an implementation process of inserting the first pilots.

Figure 4A:
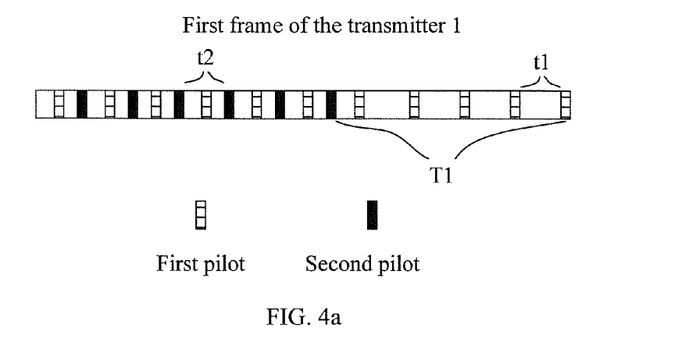
FIG. 4a is a schematic diagram of inserting first pilots and second pilots into the first frame of a local to-be-transmitted signal according to Embodiment 1 of the present invention.

It can be seen from FIG. 4a that, the first position is a frame header position of the first frame.

Specifically, during insertion of the first pilots, the first pilots are sequentially inserted into the local to-be-transmitted signal from a frame header of the first frame according to a first time interval t1.

More specifically, the first pilots are inserted from the frame header of the first frame, and sequentially inserted into the local to-be-transmitted signal according to t1. Therefore, an interval between a first pilot ranked first at a frame trailer of the first frame and a first pilot ranked last at a frame header of the second frame is also t1.

A process of inserting the second pilots is introduced below.

Insertion of the second pilots is started after the first preset duration.

Herein, the first preset duration may be represented by S1. In addition, the first preset duration is specifically a sum of a transmission delay of the local transmit signal relative to the peer receiver and a transmission delay of the peer transmit signal relative to the peer receiver. If FIG. 2 is used as an example, S1=T1+T2.

During insertion of the second pilots, the second pilots are sequentially inserted into the local to-be-transmitted signal from the second position according to a second time interval t2. In this insertion manner, the second time interval t2 exists between every two second pilots in each frame of the local to-be-transmitted signal. Moreover, the second time interval t2 also exists between a second pilot at a frame trailer of the $i^{th}$ frame of the local to-be-transmitted signal and a second pilot at a frame header of the $i+1^{th}$ frame of the local to-be-transmitted signal, where i is a positive integer.

The second time interval t2 in this embodiment may be set to a specific numerical value, and examples are not listed herein in this application.

Specifically, when i=1, referring to FIG. 4a, the first frame of the local to-be-transmitted signal is used to describe a process of inserting the second pilots.

It can be seen from FIG. 4a that, the first position and the second position are separated by the first preset duration S1, and in this case, the first preset duration S1 is equal to the transmission delay of the peer transmit signal.

Specifically, during insertion of the second pilots, the second pilots are sequentially inserted into the local to-be-transmitted signal from the second position of the first frame according to the second time interval t2.

Figure 4B:
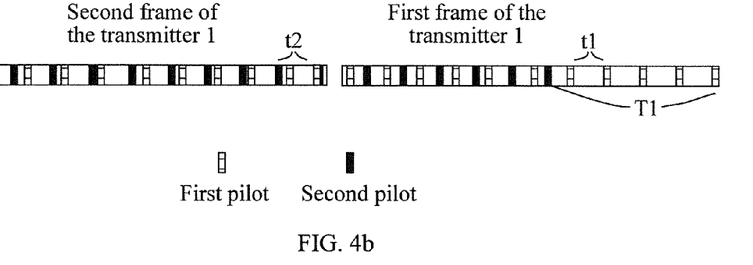
FIG. 4b is a schematic diagram of first pilots between two frames of a local to-be-transmitted signal according to Embodiment 1 of the present invention.

Because the second pilots are inserted into the whole signal, a situation in FIG. 4b occurs, in which a time interval between a second pilot at a frame trailer of the first frame and a second pilot at a frame header of the second frame is also the second time interval t2.

It should be noted that, in this embodiment of this application, the insertion of the first pilots and the insertion of the second pilots are not restricted by any time sequence, that is, the first pilots and the second pilots may be inserted simultaneously; or the first pilots may be inserted before the second pilots are inserted; or the second pilot may be inserted before the first pilots are inserted, or the like. The time sequence is determined according to an actual situation of insertion, and is not limited in this application.

The above embodiment specifically describes a case in which the local transmitter processes the local to-be-transmitted signal. After the processing, step 32 is performed, that is, the local transmit signal is obtained by using the local receiver.

In step 32, the receiver 1 is still used as an example, and in this case, the receiver 1 receives a transmit signal of the transmitter 1.

Further, step 33 is performed, that is, the peer transmit signal is obtained by using the local receiver.

If the receiver 1 is used as an example, the receiver 1 receives a transmit signal of the transmitter 2.

Specifically, the peer transmit signal is sent after third pilots and fourth pilots are inserted.

The third pilot is an original pilot of the peer transmitter, and the fourth pilot is a newly added pilot of the peer transmitter.

The pilots in this case are similar to the pilots of the local transmit signal, and are not described again in this application.

The third pilots are inserted from a third position of the peer transmit signal, the fourth pilots are inserted from a fourth position of the peer transmit signal, the third position and the fourth position are separated by second preset duration, the first pilot is orthogonal to the fourth pilot, and the second pilot is orthogonal to the third pilot. Specifically, in orthogonal computation technologies, the orthogonality indicates a specific kind of independence or decoupling. Using the first pilot and the fourth pilot as an example, if a change in a signal of the first pilot does not affect a signal of the fourth pilot, the two pilots are orthogonal to each other.

A specific implementation process of inserting the third pilots is introduced first.

During insertion of the third pilots, the third pilots are specifically inserted from a third position of the first frame of the peer transmit signal according to a third time interval, so that the third time interval exists between every two third pilots in the peer transmit signal.

The third position is a frame header position of the first frame of the peer transmit signal.

Figure 5A:
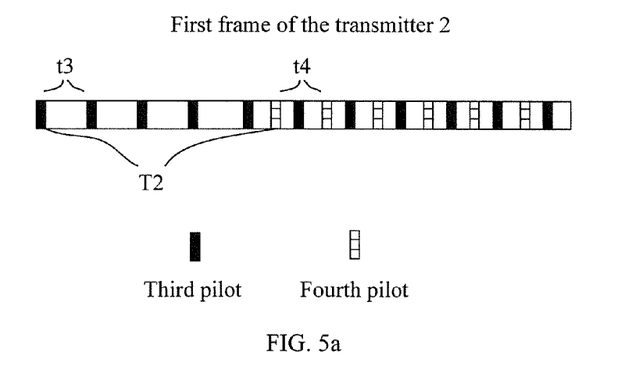
FIG. 5a is a schematic diagram of inserting third pilots and fourth pilots into the first frame of a peer transmit signal according to Embodiment 1 of the present invention.

Specifically, referring to FIG. 5a, the first frame of the peer transmit signal is used for describing the process of inserting the third pilots.

Specifically, during insertion of the third pilots, the third pilots are sequentially inserted into the peer transmit signal from a frame header of the first frame according to a third time interval t3. Therefore, a situation in FIG. 5b occurs, in which a time interval between a third pilot at a frame trailer of the first frame and a third pilot at a frame header of the second frame is also the third time interval t3.

The third time interval t3 in this embodiment may be set to a specific numerical value, and examples are not listed herein in this application.

A specific implementation process of inserting the fourth pilots is introduced below.

Insertion of the fourth pilots is started after the second preset duration.

The second preset duration is specifically a sum of a transmission delay of the local transmit signal relative to the local receiver and a transmission delay of the peer transmit signal relative to the local receiver. If FIG. 2 is used as an example, S2=T1+T2.

Specifically, the fourth pilots are specifically inserted from the fourth position according to a fourth time interval t4, so that the fourth time interval t4 exists between every two fourth pilots in each frame of the peer transmit signal, and that the fourth time interval t4 also exists between a fourth pilot at a frame trailer of the $i^{th}$ frame of the peer transmit signal and a fourth pilot at a frame header of the $i+1^{th}$ frame of the peer transmit signal.

Specifically, when i=1, referring to FIG. 5a, the first frame of the peer transmit signal is used to describe a process of inserting the fourth pilots.

It can be seen from FIG. 5a, the fourth position and the third position are separated by second preset duration S2, and in this case, the second preset duration is equal to the transmission delay of the local to-be-transmitted signal when the local to-be-transmitted signal is sent to the peer receiver, and may also be equal to S1.

Specifically, during insertion of the fourth pilots, the fourth pilots are sequentially inserted into the peer transmit signal from the fourth position of the first frame according to the fourth time interval t4.

Figure 5B:
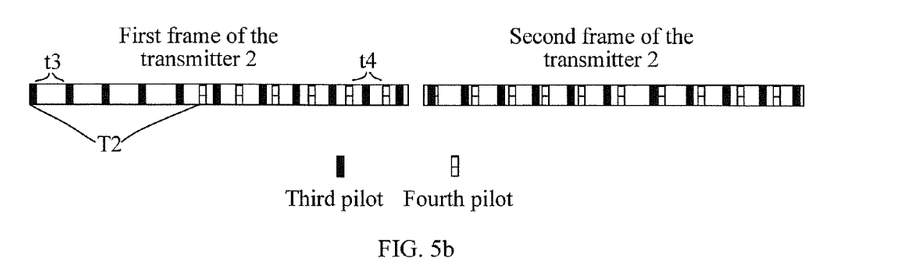
FIG. 5b is a schematic diagram of third pilots between two frames of a peer transmit signal according to Embodiment 1 of the present invention.

Because the fourth pilots are inserted into the whole signal, a situation in FIG. 5b occurs, in which a time interval between a fourth pilot at a frame trailer of the first frame and a fourth pilot at a frame header of the second frame is also the fourth time interval t4.

The fourth time interval t4 in this embodiment may be set to a specific numerical value, and examples are not listed herein in this application.

It should be noted that, in this embodiment of this application, like the insertion of the first pilots and the insertion of the second pilots, the insertion of the third pilots and the insertion of the fourth pilots are not restricted by any time sequence. That is, the third pilots and the fourth pilots may be inserted simultaneously; or the third pilots may be inserted before the fourth pilots are inserted; or the fourth pilots may be inserted before the third pilots are inserted, or the like. The time sequence is determined according to an actual situation of insertion, and is not limited in this application.

Further, step 34 is further provided, in which the local transmit signal and the peer transmit signal are parsed by using the local receiver.

Further, after the foregoing steps of pilot insertion are performed on the local to-be-transmitted signal and the peer transmit signal, the following effect is presented: the first pilot is orthogonal to the fourth pilot, and the second pilot is orthogonal to the third pilot.

The second pilot being orthogonal to the third pilot is embodied in that, the two pilots do not interfere with each other when two signals are sent to the receiver 1; and the first pilot being orthogonal to the fourth pilot is embodied in that, the two pilots do not interfere with each other when two signals are sent to the receiver 2.

When two signals are sent to a same receiver, the two signals interfere with each other. In order to prevent this situation, in this embodiment of this application, the local to-be-transmitted signal and the peer transmit signal are sent to a same receiver in an orthogonal manner.

Figure 5C:
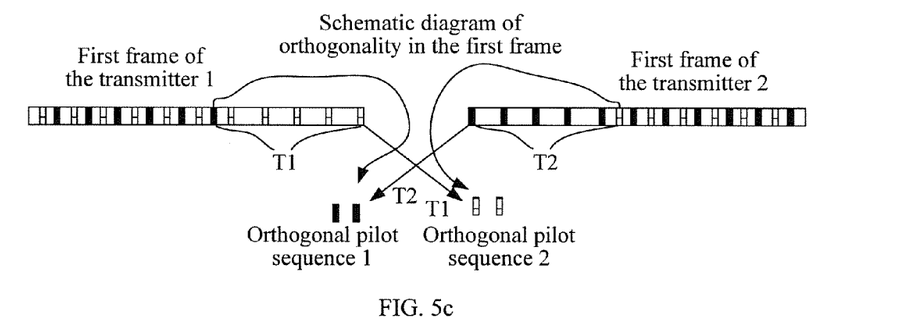
FIG. 5c is a schematic diagram of pilots that are orthogonal to each other in two signals according to Embodiment 1 of the present invention.

Referring to FIG. 5c, using pilots in the first frame of the transmitter 1 and pilots in the first frame of the transmitter 2 as an example, when the second pilots and the third pilots are orthogonal, an orthogonal pilot sequence 1 may be formed, and when the first pilots and the fourth pilots are orthogonal, an orthogonal pilot sequence 2 may be formed. Interference between other pilots may be ignored. For example, interference between the first pilots and the second pilots of the local transmit signal is not considered in the present invention. When pilots are orthogonal, the two pilots do not interfere with each other when being sent.

Using the receiver 1 as an example, when two signals are sent, it needs to be ensured that the second pilot is orthogonal to the third pilot, so as to ensure that the two signals almost do not interfere with each other when being sent to the receiver 1.

Figure 6A:
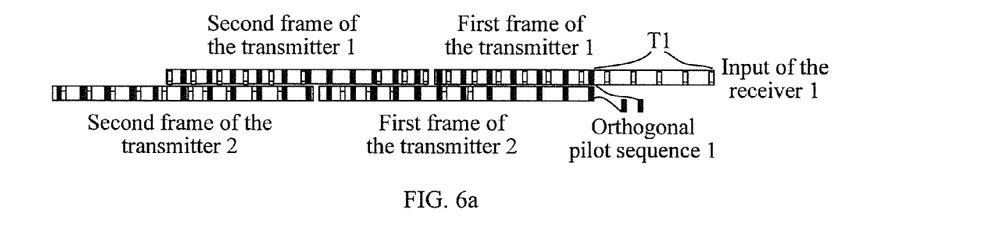
FIG. 6a is a schematic diagram of orthogonality between second pilots and third pilots according to Embodiment 1 of the present invention.

Then, referring to FIG. 6a, FIG. 6a is a schematic diagram of orthogonality between second pilots and third pilots.

When the two signals are sent to the receiver 1, even if the local to-be-transmitted signal and the peer transmit signal transmitted by the transmitter 2 are sent simultaneously, a delay time of S1 exists between the two signals due to causes such as transmission paths and distances when the two signals arrive at the receiver 1.

Therefore, the receiver 1 receives the peer transmit signal after the time S1 since the receiver 1 receives the local to-be-transmitted. However, in receiving of the local transmit signal, because the second pilot is inserted after an interval of S1 from the local transmit signal, where S1 is exactly the delay time of the peer transmit signal, the receiver 1 may receive the second pilot and the third pilot simultaneously, and a transmission delay between the two signals is avoided. In addition, the second pilot is inserted after an interval of t2, and the third pilot is inserted after an interval of t3. Therefore, if it needs to be ensured that the receiver 1 receives the second pilot and the third pilot simultaneously, t2=t3 that is, the two pilots are inserted into the respective signals after a same time interval. For the first pilot and the fourth pilot, the foregoing processing may also be performed on the first pilot, so that t1 of the first pilot is equal to t4 of the fourth pilot.

Further, because the orthogonality is maintained between the second pilot and the third pilot, it is equivalent to that the second pilot and the third pilot are sent to the receiver 1 with a phase difference of n/2; therefore, it can be further ensured that the two signals do not interfere with each other, thereby ensuring the stability of a system.

Certainly, signal interference may also exist between the first pilot and the third pilot and between the second pilot and the fourth pilot. However, such interference may be ignored in the system.

Figure 6B:
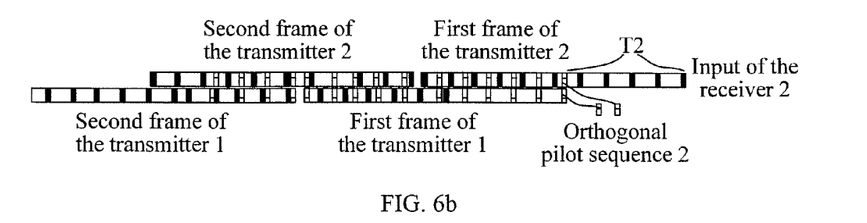
FIG. 6b is a schematic diagram of orthogonality between first pilots and fourth pilots according to Embodiment 1 of the present invention.

If the receiver 2 is used as an example, when the two signals are sent, because the fourth pilot is inserted into the peer transmit signal after an interval of S2, the first pilot and the fourth pilot are actually received simultaneously when the receiver 2 receives the two signals. In addition, the first pilot is orthogonal to the fourth pilot, which can ensure that the two signals almost do not interfere with each other when being sent to the receiver 2. Specifically, referring to FIG. 6*b*, FIG. 6*b* is a schematic diagram of orthogonality between first pilots and fourth pilots.

In addition, two schematic experimental diagrams are used in the following to explain that the pilot orthogonality reduces mutual interference between signals.

Figure 7A:
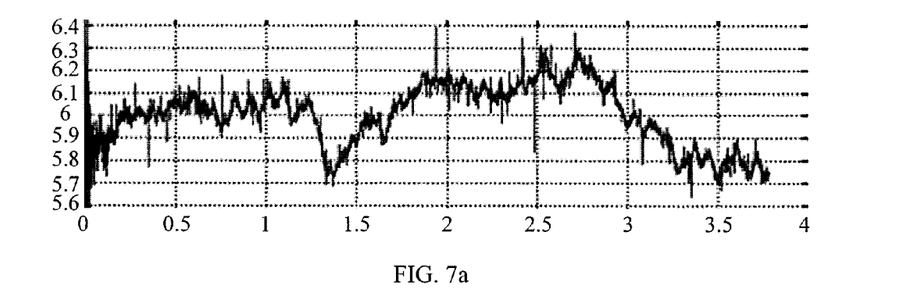
FIG. 7a is a schematic diagram of a phase output by using a random matrix according to Embodiment 1 of the present invention.

Referring to FIG. 7*a*, FIG. 7*a* is a schematic diagram of a phase output by using a random matrix. It can be seen from the figure that the output phase of a random matrix has "glitches", causing instability of the system.

Figure 7B:
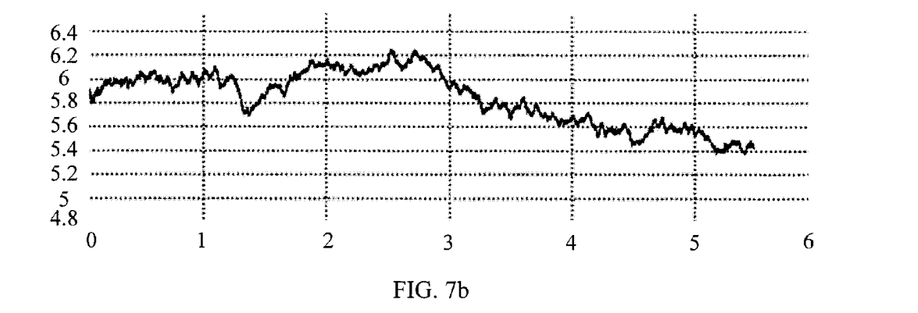
FIG. 7b is a schematic diagram of a phase output by using orthogonal pilot sequences according to Embodiment 1 of the present invention.

Referring to FIG. 7*b*, FIG. 7*b* is a schematic diagram of a phase output by using orthogonal pilot sequences according to the present invention. Performance of the system is improved effectively.

The foregoing embodiment is a specific implementation process of transmission delay compensation. Moreover, another form of delay compensation is further performed.

Referring to FIG. 2, when the receiver 1 receives signals of the transmitter 1 and the transmitter 2, a specific delay of the receiver 1 with respect to the transmitter 1 is equal to D1+T2+D2. A specific delay of the receiver 1 with respect to the transmitter 2 is equal to D3+T1+D2. If the receiver 1 needs to receive the two signals simultaneously, D1+T2+D2=D3+T1+D2. This equation indicates that when the receiver 1 receives the two transmit signals simultaneously, a delay D2 of the receiver 1 makes no difference. Therefore, in this embodiment of the present invention, if the receiver 1 needs to receive the two signals simultaneously, only a transmission delay on a link and a delay of the transmitter need to be solved.

Specifically, for the receiver 1, a signal transmitted by the transmitter 2 has been compensated with a transmission delay coefficient S2, and in this case, S2=T1+T2. Therefore, impact caused by the transmission delay may be avoided. In addition, an equalizer coefficient of the receiver 1 is fed back to transmit ends of the transmitter 1 and the transmitter 2, so that the transmitter 1 and the transmitter 2 transmit signals according to the equalizer coefficient, and delays caused by devices, namely, the transmitter 1 and the transmitter 2, are solved. Therefore, delays caused by signal transmission can be solved overall according to the foregoing two delay compensation methods.

The following specifically describes a solution to the delays caused by the devices, namely, the transmitter 1 and the transmitter 2.

Using the receiver 1 as an example, the delays may be solved in the following manner: detecting the delays by using an equalizer of the receiver 1 and feeding back the equalizer coefficient of the receiver 1 to the transmit ends of the transmitter 1 and the transmitter 2.

Figure 8:
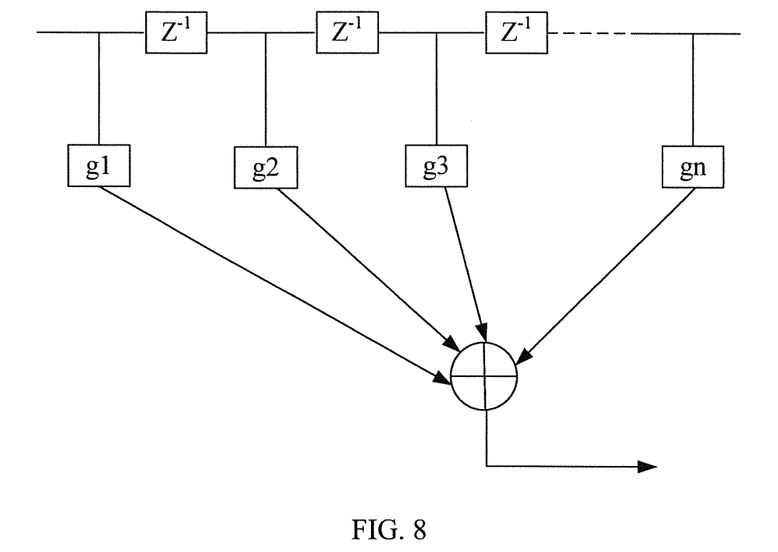
FIG. 8 is a conceptual diagram of a fractional order delay represented by a tap delay line model according to Embodiment 1 of the present invention.

Referring to FIG. 8 for specific descriptions, a tap delay line model is used to represent a fractional order delay, where g1 represents the first tap coefficient, gn represents the $n^{th}$ tap coefficient, g1-gn represents that a tap coefficient further exists between the first tap coefficient and the $n^{th}$ tap coefficient, and $Z^{-1}$ represents a delay of one beat.

If the tap coefficient g1 is used as an example, a transmission path of g1 has no delay.

If a tap coefficient g2 is used as an example, a transmission path of g2 is path $Z^{-1}$-g2, and has a delay of one beat.

If a tap coefficient g3 is used as an example, a transmission path of g3 is path $Z^{-1}$-$Z^{-1}$-g3, and has a delay of two beats.

A delay matrix may be obtained by performing calculation on the foregoing parameters according to the Mason formula.

Then, when the receiver 1 receives a signal, the signal may be expressed as:

$$Y=DX+N \qquad (1)$$

where D represents a delay matrix, X represents a transmit signal, and N represents additive noise.

If an equalizer is used to measure a delay, an equalizer coefficient of the receiver 1 is $D^{-1}$.

In this case, if a fractional delay is modeled as a filter, the fractional delay may be solved by constructing an inverse delay filter. The equalizer coefficient is fed back to the transmit end of the transmitter 1 and/or the transmit end of the transmitter 2 to serve as a coefficient of the inverse delay filter.

In this case, a signal received by the receiver 1 may be expressed as:

$$Y = D^{-1}DX + N \qquad (2)$$
$$= X + N$$

where D represents a delay matrix, X represents a transmit signal, and N represents additive noise.

If the equalizer coefficient of the receiver 1 is fed back to the transmit end of the transmitter 1 and/or the transmit end of the transmitter 2 to compensate the local to-be-transmitted signal, delays of receiver 1 relative to the transmitter 1 and the transmitter 2 may be avoided.

Based on the foregoing principle, when the local to-be-transmitted signal is compensated, there are the following three cases:

Case 1:

collecting a local-to-local equalization coefficient by using the local transmitter, and performing first delay compensation on the local to-be-transmitted signal to obtain a local compensation signal, where the local-to-local equalization coefficient is a delay coefficient of the local receiver relative to the local transmitter; and inserting the first pilots and the second pilots into the local compensation signal and transmitting the signal.

Case 2:

inserting the first pilots and the second pilots into the local to-be-transmitted signal to obtain a pilot bearing signal; and collecting a local-to-local equalization coefficient by using the local transmitter, and performing first delay compensation on the pilot bearing signal and transmitting the signal.

Case 3:

collecting a local-to-local equalization coefficient by using the local transmitter while the first pilots and the second pilots are inserted into the local to-be-transmitted signal, and performing first delay compensation on the local to-be-transmitted signal and transmitting the signal.

Specifically, in this case, the moment when the first delay compensation is performed has nothing to do with the moment when the first pilots and the second pilots are inserted into the local to-be-transmitted signal; the first delay compensation and the insertion of the first pilots and the second pilots may be performed on the local to-be-transmitted signal simultaneously, or performed on the local to-be-transmitted signal in sequence.

Further, the peer transmit signal is a transmit signal on which the peer transmitter has performed second delay compensation by using a local-to-peer equalization coefficient, where the local-to-peer equalization coefficient is a delay coefficient of the local receiver relative to the peer transmitter.

Certainly, in this case, the moment when the second delay compensation is performed has nothing to do with the moment when the third pilots and the fourth pilots are inserted into the peer transmit signal either; the second delay compensation and the insertion of the third pilots and the fourth pilots may be performed on the peer transmit signal simultaneously, or performed on the peer transmit signal in sequence.

Therefore, the peer transmit signal specifically may be three different types of transmit signals as follows:

Type 1:

a transmit signal into which the third pilots and the fourth pilots are inserted after the peer transmitter performs second delay compensation by using a local-to-peer equalization coefficient, where the local-to-peer equalization coefficient is a delay coefficient of the local receiver relative to the peer transmitter.

Type 2:

a transmit signal on which the peer transmitter performs second delay compensation by using a local-to-peer equalization coefficient after the third pilots and the fourth pilots are inserted.

Type 3:

a transmit signal on which the peer transmitter performs second delay compensation by using a local-to-peer equalization coefficient while the third pilots and the fourth pilots are inserted.

In conclusion, in the present invention, during delay compensation on signals, by using a transmitter 1 and a transmitter 2 as an example, coefficients of a receive-end equalizer corresponding to the transmitter 1 and the transmitter 2 are extracted first to serve as compensation coefficients of inverse delay filters of the transmitter 1 and the transmitter 2 for delay compensation, so that impact of a delay of a receiver on the two signals can be avoided.

Secondly, in the present invention, during delay compensation on signals, first pilots and second pilots are inserted into a frame structure of a local to-be-transmitted signal. Third pilots and fourth pilots are inserted into a frame structure of a peer transmit signal. The second pilot of the transmitter 1 and the third pilot of the transmitter 2 are made to be orthogonal, and the first pilot of the transmitter 1 and the fourth pilot of the transmitter 2 are made to be orthogonal.

In addition, when the second pilots are inserted, a second time interval exists between every two second pilots in a frame, and the second time interval also exists between a second pilot at a frame trailer of the $i^{th}$ frame and a second pilot at a frame header of the $i+1^{th}$ frame. In addition, when the fourth pilots are inserted, a fourth time interval exists between every two fourth pilots in a frame, and the fourth time interval also exists between a fourth pilot at a frame trailer of the $i^{th}$ frame and a fourth pilot at a frame header of the $i+1^{th}$ frame.

In conclusion, two transmitters perform pilot insertion processing on respective signals, so that a relative delay due to external causes such as transmission distances is avoided between the two signals; further, the equalizer coefficients that are corresponding to the transmitters and collected by the receiver are used as compensations for delays, thereby further reducing a relative delay between the two signals.

In addition, in an actual situation, the manner of pilot insertion and the manner of using an equalizer coefficient as a compensation for a delay may be independent of each other. For example, if there is no difference in transmission delays of the transmitter 1 and the transmitter 2, and the difference only lies in device delays of the transmitter 1 and the transmitter 2, compensation may be performed by using equalizer coefficients as compensations for delays. If device delays of the transmitter 1 and the transmitter 2 are ignored, the manner of pilot insertion may be used to solve the difference in transmission delays of the transmitter 1 and the transmitter 2.

Embodiment 2

Figure 9:
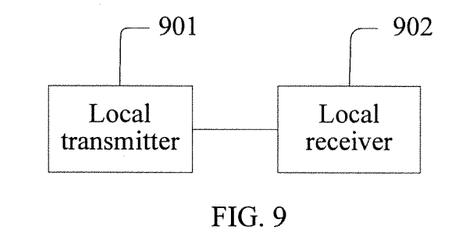
FIG. 9 is a schematic diagram of an information processing apparatus according to Embodiment 2 of the present invention.

Based on a same invention conception, Embodiment 2 of the present invention provides an information processing apparatus herein, including:

a local transmitter 901, configured to obtain a local to-be-transmitted signal, and insert first pilots and second pilots into the local to-be-transmitted signal and transmit the signal, where the first pilots are inserted from a first position of the local to-be-transmitted signal, the second pilots are inserted from a second position of the local to-be-transmitted signal, and the first position and the second position are separated by first preset duration; and a local receiver 902, configured to obtain a local transmit signal, where the local receiver 902 is further configured to obtain a peer transmit signal, where the peer transmit signal is sent after third pilots and fourth pilots are inserted, the third pilots are inserted from a third position of the peer transmit signal, the fourth pilots are inserted from a fourth position of the peer transmit signal, the third position and the fourth position are separated by second preset duration, the first pilot is orthogonal to the fourth pilot, and the second pilot is orthogonal to the third pilot; and the local receiver 902 is further configured to parse the local transmit signal and the peer transmit signal.

Specifically, the local transmitter 901 is further configured to:

collect a local-to-local equalization coefficient by using the local transmitter 901, and perform first delay compensation on the local to-be-transmitted signal to obtain a local compensation signal, where the local-to-local equalization coefficient is a delay coefficient of the local receiver 902 relative to the local transmitter 901; and insert the first pilots and the second pilots into the local compensation signal and transmit the signal.

Specifically, the local transmitter 901 is further configured to:

insert the first pilots and the second pilots into the local to-be-transmitted signal to obtain a pilot bearing signal; and collect a local-to-local equalization coefficient by using the local transmitter 901, and perform first delay compensation on the pilot bearing signal and transmit the signal.

Specifically, the local transmitter 901 is further configured to:

collect a local-to-local equalization coefficient by using the local transmitter 901 while the first pilots and the second pilots are inserted into the local to-be-transmitted signal, and perform first delay compensation on the local to-be-transmitted signal and transmit the signal.

Specifically, the peer transmit signal specifically is:

a transmit signal into which the third pilots and the fourth pilots are inserted after the peer transmitter performs second delay compensation by using a local-to-peer equalization coefficient, where the local-to-peer equalization coefficient is a delay coefficient of the local receiver 902 relative to the peer transmitter; or a transmit signal on which the peer transmitter performs second delay compensation by using a local-to-peer equalization coefficient after the third pilots and the fourth pilots are inserted; or a transmit signal on which the peer transmitter performs second delay compensation by using a local-to-peer equalization coefficient while the third pilots and the fourth pilots are inserted.

Specifically, the local transmitter 901 is specifically configured to:

obtain the local to-be-transmitted signal, and sequentially insert the first pilots into the local to-be-transmitted signal from the first position according to a first time interval, so that the first time interval exists between every two first pilots in the local to-be-transmitted signal, where the first position is a frame header position of the first frame of the local to-be-transmitted signal; and sequentially insert the second pilots into the local to-be-transmitted signal from the second position according to a second time interval, so that the second time interval exists between every two second pilots in each frame of the local to-be-transmitted signal, and that the second time interval also exists between a second pilot at a frame trailer of the $i^{th}$ frame of the local to-be-transmitted signal and a second pilot at a frame header of the $i+1^{th}$ frame of the local to-be-transmitted signal, where i is a positive integer.

Specifically, the third pilots are specifically inserted from the third position of the peer transmit signal according to a third time interval, so that the third time interval exists between every two third pilots in the peer transmit signal, where the third position is a frame header position of the first frame of the peer transmit signal.

Specifically, the fourth pilots are specifically inserted from the fourth position according to a fourth time interval, so that the fourth time interval exists between every two fourth pilots in each frame of the peer transmit signal, and that the fourth time interval also exists between a fourth pilot at a frame trailer of the $i^{th}$ frame of the peer transmit signal and a fourth pilot at a frame header of the $i+1^{th}$ frame of the peer transmit signal.

Specifically, the first pilot is an original pilot of the local transmitter 901, and the second pilot is a newly added pilot of the local transmitter 901.

Specifically, the third pilot is an original pilot of the peer transmitter, and the fourth pilot is a newly added pilot of the peer transmitter.

By using the technical solution provided herein by this embodiment of the present invention, when the local receiver parses the local transmit signal and the peer transmit signal, the second pilot of the local transmit signal is inserted after the first preset duration and the third pilot of the peer transmit signal is inserted immediately. It is also after the first preset duration that the local transmitter receives the peer transmit signal, and therefore, when the local transmitter parses the obtained local transmit signal and peer transmit signal, the second pilot and the third pilot can be obtained at the same time, so that a transmission delay due to causes such as transmission distances can be avoided, and the system can perform channel estimation accurately. In addition, because the second pilot is orthogonal to the third pilot, it can be ensured that when two signals are transmitted to the local receiver, transmission of the two signals does not interfere with each other, and a transmission effect is relatively good.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An information processing method, the method comprising:
   obtaining a local to-be-transmitted signal by using a local transmitter, and inserting first pilots and second pilots into the local to-be-transmitted signal and transmitting the signal, wherein the first pilots are inserted from a first position of the local to-be-transmitted signal according to a first time interval, the second pilots are inserted from a second position of the local to-be-transmitted signal according to a second time interval, and the first position and the second position are separated by first preset duration, wherein the first preset duration is specifically a sum of a transmission delay of a local transmit signal relative to a peer receiver and a transmission delay of a peer transmit signal relative to the peer receiver;
   obtaining a local transmit signal by using a local receiver;
   obtaining a peer transmit signal by using the local receiver, wherein the peer transmit signal is sent after third pilots and fourth pilots are inserted, the third pilots are inserted from a third position of the peer transmit signal according to a third time interval, the fourth pilots are inserted from a fourth position of the peer transmit signal according to a fourth time interval, the third position and the fourth position are separated by second preset duration, the first pilot is orthogonal to the fourth pilot, and the second pilot is orthogonal to the third pilot, wherein the second preset duration is a sum of a transmission delay of the local transmit signal relative to the local receiver and a transmission delay of the peer transmit signal relative to the local receiver;
   parsing the local transmit signal and the peer transmit signal by using the local receiver; and
   performing delay compensation:
      on the local to-be transmitted signal, or
      on the pilot bearing signal, or
      by using a local-to-peer equalization coefficient.

2. The method according to claim 1, wherein inserting first pilots and second pilots into the local to-be-transmitted signal and transmitting the signal comprises:
   collecting a local-to-local equalization coefficient by using the local transmitter, and performing first delay compensation on the local to-be-transmitted signal to obtain a local compensation signal, wherein the local-to-local equalization coefficient is a delay coefficient of the local receiver relative to the local transmitter; and
   inserting the first pilots and the second pilots into the local compensation signal and transmitting the signal.

3. The method according to claim 1, wherein inserting first pilots and second pilots into the local to-be-transmitted signal and transmitting the signal further comprises:
   inserting the first pilots and the second pilots into the local to-be-transmitted signal to obtain a pilot bearing signal; and
   collecting a local-to-local equalization coefficient by using the local transmitter, and performing first delay compensation on the pilot bearing signal and transmitting the signal.

4. The method according to claim 1, wherein inserting first pilots and second pilots into the local to-be-transmitted signal and transmitting the signal further comprises:
   collecting a local-to-local equalization coefficient by using the local transmitter while the first pilots and the second pilots are inserted into the local to-be-transmitted signal, and performing first delay compensation on the local to-be-transmitted signal and transmitting the signal.

5. The method according to claim 1, wherein the peer transmit signal comprises:
   a transmit signal into which the third pilots and the fourth pilots are inserted after the peer transmitter performs second delay compensation by using the local-to-peer equalization coefficient, wherein the local-to-peer equalization coefficient is a delay coefficient of the local receiver relative to the peer transmitter; or
   a transmit signal on which the peer transmitter performs second delay compensation by using the local-to-peer equalization coefficient after the third pilots and the fourth pilots are inserted; or
   a transmit signal on which the peer transmitter performs second delay compensation by using the local-to-peer equalization coefficient while the third pilots and the fourth pilots are inserted.

6. The method according to claim 1, wherein obtaining a local to-be-transmitted signal by using a local transmitter, and inserting first pilots and second pilots into the local to-be-transmitted signal comprises:
   obtaining the local to-be-transmitted signal by using the local transmitter, and sequentially inserting the first pilots into the local to-be-transmitted signal from the first position according to the first time interval, so that the first time interval exists between every two first pilots in the local to-be-transmitted signal, wherein the first position is a frame header position of the first frame of the local to-be-transmitted signal; and
   sequentially inserting the second pilots into the local to-be-transmitted signal from the second position according to the second time interval, so that the second time interval exists between every two second pilots in each frame of the local to-be-transmitted signal, and that the second time interval also exists between a second pilot at a frame trailer of the $i^{th}$ frame of the local to-be-transmitted signal and a second pilot at a frame header of the $i+1^{th}$ frame of the local to-be-transmitted signal, wherein i is a positive integer.

7. The method according to claim 6, further comprising:
   inserting the third pilots from a third position of the first frame of the peer transmit signal according to the third time interval, so that the third time interval exists between every two third pilots in the peer transmit signal, wherein the third position is a frame header position of the first frame of the peer transmit signal.

8. The method according to claim 6, further comprising:
   inserting the fourth pilots from the fourth position according to the fourth time interval, so that the fourth time interval exists between every two fourth pilots in each frame of the peer transmit signal, and that the fourth time interval also exists between a fourth pilot at a frame trailer of the $i^{th}$ frame of the peer transmit signal and a fourth pilot at a frame header of the $i+1^{th}$ frame of the peer transmit signal.

9. The method according to claim 1, wherein the first pilot is an original pilot of the local transmitter, and the second pilot is a newly added pilot of the local transmitter.

10. The method according to claim 1, wherein the third pilot is an original pilot of the peer transmitter, and the fourth pilot is a newly added pilot of the peer transmitter.

11. An information processing apparatus, comprising:
   a local transmitter, configured to obtain a local to-be-transmitted signal, and insert first pilots and second pilots into the local to-be-transmitted signal and transmit the signal, wherein the first pilots are inserted from a first position of the local to-be-transmitted signal according to a first time interval, the second pilots are inserted from a second position of the local to-be-transmitted signal according to a second time interval, and the first position and the second position are separated by first preset duration, wherein the first preset duration is specifically a sum of a transmission delay of a local transmit signal relative to a peer receiver and a transmission delay of a peer transmit signal relative to the peer receiver; and
   a local receiver, configured to:
      obtain a local transmit signal,
      obtain a peer transmit signal, wherein the peer transmit signal is sent after third pilots and fourth pilots are inserted, the third pilots are inserted from a third position of the peer transmit signal according to a third time interval, the fourth pilots are inserted from a fourth position of the peer transmit signal according to a fourth time interval, the third position and the fourth position are separated by second preset duration, the first pilot is orthogonal to the fourth pilot, and the second pilot is orthogonal to the third pilot, wherein the second preset duration is a sum of a transmission delay of the local transmit signal relative to the local receiver and a transmission delay of the peer transmit signal relative to the local receiver,
      parse the local transmit signal and the peer transmit signal, and
      perform delay compensation:
         on the local to-be transmitted signal; or
         on the pilot bearing signal; or
         by using a local-to-peer equalization coefficient.

12. The apparatus according to claim 11, wherein the local transmitter is further configured to:
   collect a local-to-local equalization coefficient by using the local transmitter, and perform first delay compensation on the local to-be-transmitted signal to obtain a local compensation signal, wherein the local-to-local equalization coefficient is a delay coefficient of the local receiver relative to the local transmitter; and
   insert the first pilots and the second pilots into the local compensation signal and transmit the signal.

13. The apparatus according to claim 11, wherein the local transmitter is further configured to:
   insert the first pilots and the second pilots into the local to-be-transmitted signal to obtain a pilot bearing signal; and
   collect a local-to-local equalization coefficient by using the local transmitter, and perform first delay compensation on the pilot bearing signal and transmit the signal.

14. The apparatus according to claim 11, wherein the local transmitter is further configured to:
   collect a local-to-local equalization coefficient by using the local transmitter while the first pilots and the second pilots are inserted into the local to-be-transmitted signal, and perform first delay compensation on the local to-be-transmitted signal and transmit the signal.

15. The apparatus according to claim 11, wherein the peer transmit signal comprises:
   a transmit signal into which the third pilots and the fourth pilots are inserted after the peer transmitter performs second delay compensation by using the local-to-peer equalization coefficient, wherein the local-to-peer equalization coefficient is a delay coefficient of the local receiver relative to the peer transmitter; or
   a transmit signal on which the peer transmitter performs second delay compensation by using the local-to-peer equalization coefficient after the third pilots and the fourth pilots are inserted; or
   a transmit signal on which the peer transmitter performs second delay compensation by using the local-to-peer equalization coefficient while the third pilots and the fourth pilots are inserted.

16. The apparatus according to claim 11, wherein the local transmitter is configured to:
   obtain the local to-be-transmitted signal, and sequentially insert the first pilots into the local to-be-transmitted signal from the first position according to the first time interval, so that the first time interval exists between every two first pilots in the local to-be-transmitted signal, wherein the first position is a frame header position of the first frame of the local to-be-transmitted signal; and
   sequentially insert the second pilots into the local to-be-transmitted signal from the second position according to the second time interval, so that the second time interval exists between every two second pilots in each frame of the local to-be-transmitted signal, and that the second time interval also exists between a second pilot at a frame trailer of the $i^{th}$ frame of the local to-be-transmitted signal and a second pilot at a frame header of the $i+1^{th}$ frame of the local to-be-transmitted signal, wherein i is a positive integer.

17. The apparatus according to claim 16, wherein the local transmitter is further configured to:
   insert the third pilots from a third position of the first frame of the peer transmit signal according to the third time interval, so that the third time interval exists between every two third pilots in the peer transmit signal, wherein the third position is a frame header position of the first frame of the peer transmit signal.

18. The apparatus according to claim 16, wherein the local transmitter is further configured to:
   insert the fourth pilots from the fourth position according to the fourth time interval, so that the fourth time interval exists between every two fourth pilots in each frame of the peer transmit signal, and that the fourth time interval also exists between a fourth pilot at a frame trailer of the $i^{th}$ frame of the peer transmit signal and a fourth pilot at a frame header of the $i+1^{th}$ frame of the peer transmit signal.

19. The apparatus according to claim 11, wherein the first pilot is an original pilot of the local transmitter, and the second pilot is a newly added pilot of the local transmitter.

20. The apparatus according to claim 11, wherein the third pilot is an original pilot of the peer transmitter, and the fourth pilot is a newly added pilot of the peer transmitter.

* * * * *